June 11, 1940.  A. P. STONE  2,204,516

BATTERY POST SCRAPER

Filed Nov. 2, 1939

INVENTOR.
ARTHUR P. STONE
BY
*Ralph Barrow*
ATTORNEY.

Patented June 11, 1940

2,204,516

UNITED STATES PATENT OFFICE 2,204,516

BATTERY POST SCRAPER

Arthur P. Stone, Akron, Ohio, assignor to The Wright Tool and Forge Company, Barberton, Ohio, a corporation of Ohio Application November 2, 1939, Serial No. 302,561

9 Claims. (Cl. 32—1)

This invention relates to battery post scrapers.

An object of this invention is to provide an improved battery post scraper of simple compact construction, by means of which the posts may be uniformly scraped or trimmed to provide smooth clean contact surfaces for the battery terminal connectors.

Another object of the invention is to provide a device of the character described which is self-adjusting effectively to trim battery posts of varying sizes and having varying degrees of taper.

Another object of the invention is to provide a device of the character described which is adapted to be positioned over a battery post and then rotated in either direction, to scrape or trim the post without gouging it.

Another object of the invention is to provide a device of the character described in which the cutter blades are readily reversible to present new cutting edges as the old ones become dull from use.

These and other objects of the invention will be manifest from the following brief description and the accompanying drawing.

Figure 1:
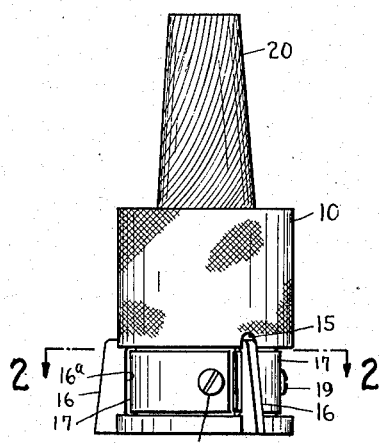
Figure 1 is an elevational view of the device embodying the invention.
Figure 3:
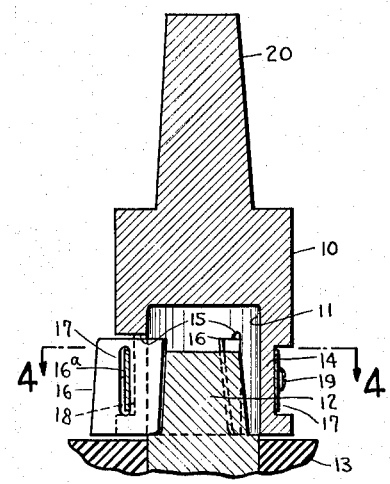
Figure 3 is a vertical cross-section of the device shown in Figure 1, but illustrated in position for use in scraping a battery post.
Figure 2:
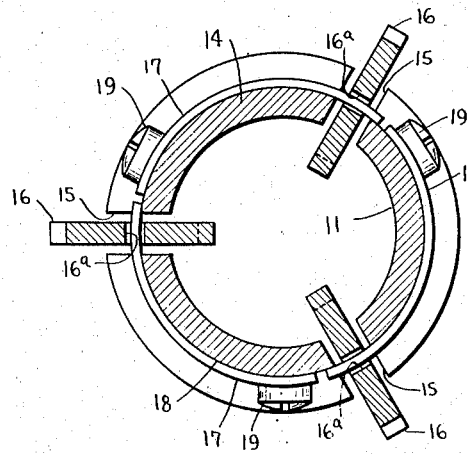
Figure 2 is a cross-section taken on the line 2—2 of Figure 1.

Referring to the drawing, the numeral 10 designates a cylindrical body having a recess or bore 11 in one end thereof for receiving a terminal post 12 of a standard storage battery 13, with substantial clearance between the surface of the bore and the surface of the post (see Figure 3). The wall 14 around the bore 11 may have a series of radial slots 15, 15, extending longitudinally of the body, from the recessed end thereof, these slots being adapted to receive loosely therein cutter blades 16, 16, normally arranged substantially in radial planes from the axis of the body 10.

The blades 16 have longitudinally extending slots 16a therein, for loosely receiving the free ends of flat springs 17, 17, these springs being curved to fit in an annular groove 18 in the outer periphery of wall 14, the other end of the springs being secured to the body 10 as by means of screws 19, 19. Springs 17 may be of thin flexible material so that they will twist to allow cutter blades 16 to conform to any taper on a battery post being scraped. The inner faces of blades 15 preferably are squared to provide double cutting edges, and may be tapered to correspond to the standard taper on battery posts. The outer surfaces of the blades 16 may also be squared and tapered so that when the inner cutting edges become dull from use, the blades may be reversed on the springs 17 with the unused cutting edges inward, thereby providing two new cutting edges.

The solid end of body 10 may be provided with a tapered pin 20, the tapered surface thereof having suitable serrations, so that the pin may be inserted and turned in the post opening of a battery terminal connector (not shown) to scrape the same, thereby to clean the inner surface of the terminal connectors which engage the battery posts.

Figure 4:
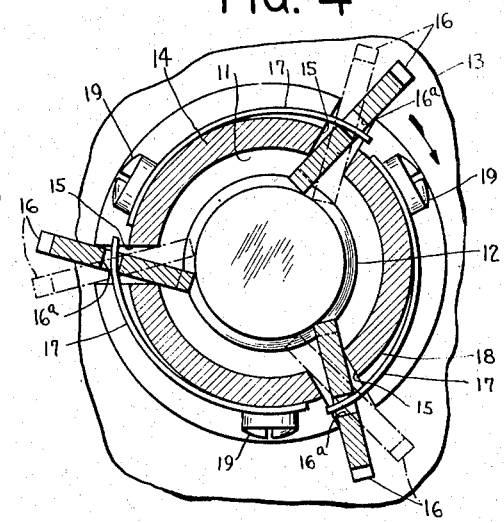
Figure 4 is a cross-section taken substantially along the line 4—4 of Figure 3.

In the use of the device for scraping battery posts, the body 10 is positioned over the battery post 12, as shown in Figure 3, thereby yieldingly engaging the blades 15 against the surface of the post. The body 10 is then rotated in either direction, so that the blades 15, by being received loosely through the slots 15, are rocked out of their radial planes, whereby a cutting edge of each blade is dragged against the tapered surface of the post to scrape the same. As best shown in Figure 4, when the body 10 is rotated in a clock-wise direction, the blades 16 will assume the full-line positions, and when the body is rotated in reverse direction the blades 16 will assume the chain-dotted positions. In either case the blades are always dragged against the surface of the post, thereby eliminating danger of gouging the same. The yielding action of the springs 17 permits the blades 16 to conform to battery posts having varying degrees of taper and also permits the blades to conform to posts of varying sizes, this feature being particularly desirable because battery terminal posts sometimes vary in size and degree and taper on different makes of batteries. The device readily adjusts itself, for example, to posts which have become reduced in diameter due to frequent scraping thereof to clean the same. The tool is also adapted effectively to scrape posts which have become variously corroded.

Modifications of the invention may be resorted to without departing from the spirit thereof or the scope of the appended claims.

What is claimed is:

1. A battery post scraper, comprising a body having a recess at one end for receiving a battery post therein, said body having a slot therein communicating with said recess, a cutting tool received in said slot, and yieldable means on said body yieldingly to urge said tool inwardly to engage a battery post received in said recess, said tool thereby being yieldingly self-adjusting to the shapes of battery posts.

2. A battery post scraper, comprising a body having a recess at one end for receiving a battery post therein, said body having a plurality of radial openings communicating with said recess, cutting tools extending through said openings, and yieldable means for supporting said tools on said body yieldingly to urge said tools radially inwardly to engage a battery post received in said recess, said tools thereby being yieldingly self-adjusting to the shapes of battery posts.

3. A battery post scraper, comprising a body having a recess at one end for receiving a battery post therein, said body having a plurality of radial slots extending longitudinally of the body and communicating with said recess, cutter blades received through said radial slots, and yieldable means for urging said cutter blades radially inwardly to engage a battery post received in said recess, said tools thereby yieldingly self-adjusting to the shapes of battery posts.

4. A battery post scraper, comprising a body having a recess at one end for receiving a battery post therein, said body having a plurality of radial slots extending longitudinally of the body and communicating with said recess, cutter blades received through said radial slots, and yieldable means for urging said cutter blades radially inwardly to engage a battery post received in said recess, said yieldable means permitting said cutter blades to be self-adjusting to any taper of the battery post, said tools thereby being yieldingly self-adjusting to the shapes of battery posts.

5. A battery post scraper comprising a body having a recess at one end thereof for receiving a tapered battery post therein, said body having a plurality of radial slots extending longitudinally of the body and communicating with said recess, cutter blades received through said radial slots, said blades having slots therein extending longitudinally of said body, flat flexible springs secured at one end to said body, the free ends of said springs being received through said slots in said blades to retain the same in said radial slots, said springs thereby yieldingly urging said blades radially inwardly to engage a battery post in said recess, said springs permitting said blades to be self-adjusting to any taper of the battery post.

6. A batttery post scraper, comprising a body having a recess at one end for receiving a battery post therein, said body having a plurality of radial slots extending longitudinally of the body and communicating with said recess, cutter blades received through said slots, the inner faces of each of said blades being squared to provide a pair of cutting edges, and yieldable means for urging said cutter blades radially inwardly to engage a battery post received in said recess, said blades being mounted in said slots so as to rock out of their normal radial planes against the action of said yieldable means, whereby when said body is rotated in either direction about a terminal post one edge or the other of said blades will engage the post to scrape the same.

7. A battery post scraper comprising a body having a recess at one end for receiving a battery post therein, said body having a plurality of radial slots extending longitudinally of the body and communicating with said recess, cutter blades received loosely through said slots, the inner faces of each of said blades being formed with a pair of spaced cutting edges, and yieldable means mounted on said body for yieldingly urging said blades radially inwardly, whereby the body may be rotated in opposite directions about a battery post to engage one of said cutting edges or the other of said blades with the surfaces of said post, said blades rocking in said slots to engage one cutting edge or the other thereof with said post as said body is rotated.

8. A battery post scraper comprising a body having a recess at one end thereof for receiving a tapered battery post therein, said body having a plurality of radial slots extending longitudinally of the body and communicating with said recess, cutter blades received through said radial slots, said blades having slots therein extending longitudinally of said blades, flat flexible springs secured at one end to said body, the free ends of said springs being received through said slots in said blades to retain the same in said radial slots, said springs thereby yieldingly urging said blades radially inwardly to engage a battery post in said recess, whereby the blades are self-adjusting to adapt them to various sizes and tapers of battery posts, said cutter blades having cutting edges at radially opposite ends thereof, whereby said blades may be mounted in reversed relation on said springs to present either of said radial ends to a battery post within said recess.

9. A battery post scraper, comprising a body having a recess at one end for receiving a battery post therein, said body having a plurality of radial slots extending longitudinally of the body and communicating with said recess, cutter blades received through said radial slots, yieldable means for urging said cutter blades radially inwardly to engage a battery post received in said recess, said cutter blades having cutting edges at radially opposite ends thereof, and means for reversibly mounting said blades in said radial slots in association with said springs to present either of said radial ends to a battery post within said recess.

ARTHUR P. STONE.